United States Patent

Fukuoka

[11] Patent Number: 6,056,357
[45] Date of Patent: May 2, 2000

[54] APPARATUS FOR VIBRATING SEATS

[75] Inventor: Masahiro Fukuoka, Nishikamo-gun, Japan

[73] Assignee: Yukihiko Saitoh, Osaka, Japan

[21] Appl. No.: 08/717,728

[22] Filed: Sep. 23, 1996

[30] Foreign Application Priority Data

Jun. 11, 1996 [JP] Japan ..................................... 8-149377

[51] Int. Cl.[7] .............................. A47C 7/62; A47C 31/00
[52] U.S. Cl. .................................. 297/217.3; 297/260.2; 601/57
[58] Field of Search ............................. 297/260.2, 217.3, 297/217.1, 330; 601/56, 57, 58, 59, 60

[56] References Cited

U.S. PATENT DOCUMENTS

| | | |
|---|---|---|
| 1,241,171 | 9/1917 | Vitullo ................................. 297/260.2 |
| 1,615,615 | 1/1927 | Cannon . |
| 2,420,965 | 5/1947 | Mininberg . |
| 2,512,621 | 6/1950 | Emerson . |
| 2,587,207 | 2/1952 | Peterson . |
| 2,861,806 | 1/1958 | Disney . |
| 2,891,538 | 6/1959 | Moxley . |
| 2,894,505 | 7/1959 | Manausa . |
| 3,009,460 | 11/1961 | Leach . |
| 3,037,499 | 6/1962 | Cummins . |
| 3,107,549 | 10/1963 | Matthews . |
| 3,455,296 | 7/1969 | McCaleb . |
| 3,653,375 | 4/1972 | Raffel . |
| 3,732,860 | 5/1973 | Thurmer . |
| 3,865,430 | 2/1975 | Tanus . |
| 3,948,379 | 4/1976 | Warner . |
| 3,999,539 | 12/1976 | Meador ................................ 297/260.2 |
| 4,057,053 | 11/1977 | Kunz . |
| 4,203,098 | 5/1980 | Muncheryan . |
| 4,465,158 | 8/1984 | Yamazaki et al. . |
| 5,022,708 | 6/1991 | Nordella . |
| 5,094,225 | 3/1992 | Craw . |
| 5,113,851 | 5/1992 | Gamba . |
| 5,129,704 | 7/1992 | Kishi . |
| 5,348,370 | 9/1994 | Fukuoka ............................... 297/217.3 |
| 5,462,515 | 10/1995 | Tseng . |
| 5,490,713 | 2/1996 | Fukuoka ............................... 297/217.3 |
| 5,516,192 | 5/1996 | Fukuoka ............................... 297/217.3 |
| 5,542,741 | 8/1996 | Fukuoka ............................... 297/217.3 |
| 5,556,161 | 9/1996 | Fukuoka ............................... 297/217.3 |

FOREIGN PATENT DOCUMENTS

| | | |
|---|---|---|
| 2 500 382 | 8/1982 | France . |
| 2 525 501 | 10/1983 | France . |
| 32 35 373 A1 | 3/1984 | Germany . |
| 59-209925 | 11/1984 | Japan . |
| 3-67727 | 3/1991 | Japan . |
| 3-136927 | 6/1991 | Japan . |
| 3-204343 | 9/1991 | Japan . |
| 4-9141 | 1/1992 | Japan . |
| 4-66335 | 2/1992 | Japan . |
| 4-159122 | 6/1992 | Japan . |
| 1445150 | 8/1976 | United Kingdom . |

OTHER PUBLICATIONS

Patent Abstracts of Japan, Publication No. JP3112728, May 14, 1991 Absrtact vol. 015307.
Patent Abstracts of Japan, Publication No. JP60173402, Sep. 6, 1985, Abstract vol. 010019.
Patent Abstracts of Japan, Publication No. JP63140141, Jun. 11, 1988, Abstract vol. 012386.

*Primary Examiner*—Anthony D. Barfield
*Attorney, Agent, or Firm*—Armstrong, Westerman, Hattori, McLeland & Naughton

[57] ABSTRACT

An apparatus for vibrating a seat for effectively preventing a driver from dozing off during driving is provided which includes a seat fixed on a sliding mechanism mounted on a floor surface of an automobile, a direct current motor placed within a seat bottom of the seat, unbalanced weights connected with a rotation shaft of the direct current motor whereby the direct current motor is actuated so as to rotate the unbalanced weights and produce vibration for vibrating the seat.

3 Claims, 7 Drawing Sheets ion; and

APPARATUS FOR VIBRATING SEATS

FIELD OF THE INVENTION

The present invention relates to an apparatus for vibrating a seat to be employed as a driver's seat in an automobile and similar so as to prevent the driver from dozing off during driving of the automobile.

BACKGROUND OF THE INVENTION

A variety of apparatus have been proposed to keep a driver of an automobile or similar alert and to prevent the driver from dozing off during driving. Such an apparatus usually includes a sensor for sensing that the driver has started to doze off and facilities for awakening the driver by receiving a signal from the sensor. For example, a sensor is known which senses that a driver has started to doze off by sensing the number of times the driver nods his head per unit of time or the number of times the driver leans his head forward or similar, because the driver nods his head when he starts to doze off, and so the sensor sends a signal to facilities for awakening the driver. Also, facilities are known for alerting a driver. The alerting facilities operate by receiving a signal and alerting the driver by producing a loud sound to the driver's ear(s). Therefore, according to the above described apparatus having a sensor and alerting facilities, if a driver starts to doze off, the sensor senses that the driver's head is leaning forward, and actuates the alerting facilities for alerting and awakening the driver.

However, because the above-mentioned apparatus operates only after a driver has started to doze off, the driver may lose his concentration, due to drowsiness, and cause a car accident when the driver has started to doze off to such a degree that the alerting facilities for alerting and awakening the driver may not be effective.

Accordingly, it is an object of the present invention to provide apparatus for effectively preventing a driver from dozing off by vibrating the seat in which the driver of the automobile is sitting.

SUMMARY OF THE INVENTION

To accomplish the above object, a first gist of the present invention relates to an apparatus for vibrating a seat including a seat fixed on a seat-support member installed on a floor surface and facilities for vibrating the seat. The vibrating facilities is the seat is aligned within a seat bottom of the seat. A second gist of the present invention relates to an apparatus for vibrating a seat including a seat fixed on a seat-support member installed on a floor surface and facilities for vibrating the seat is directly installed on an under surface of a seat bottom of a seat.

As a result of a series of studies on apparatus to effectively prevent dozing off during driving, the inventor noticed that it is too late to prevent accidents when a driver is awakened by a sensor which senses a driver has started to doze off. Then, he compiled further studies and reached a conclusion that, if a driver's seat is always being vibrated, the driver remains alert and does not doze off, and, as a result, traffic accidents that are caused by dozing off during driving can be completely prevented.

BRIEF DESCRIPTION OF THE DRAWING FIGURES

The invention will be more fully described and will be better understood from the following description, taken with the appended drawings, in which.

DETAILED DESCRIPTION OF THE INVENTION

The following are the detailed description of the various embodiments.

Figure 1:
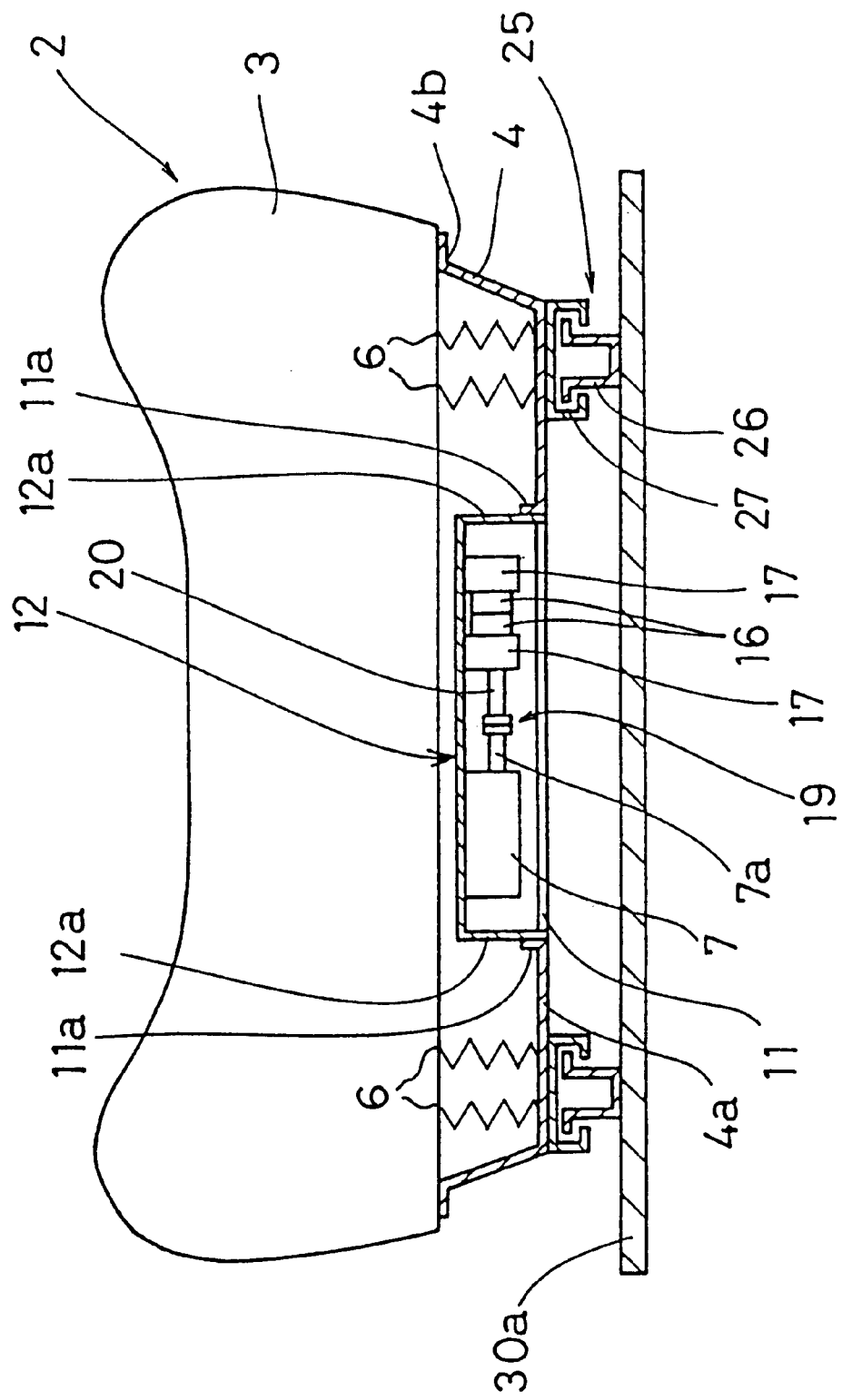
FIG. 1 is a side view of a first embodiment of the present invention.
Figure 2:
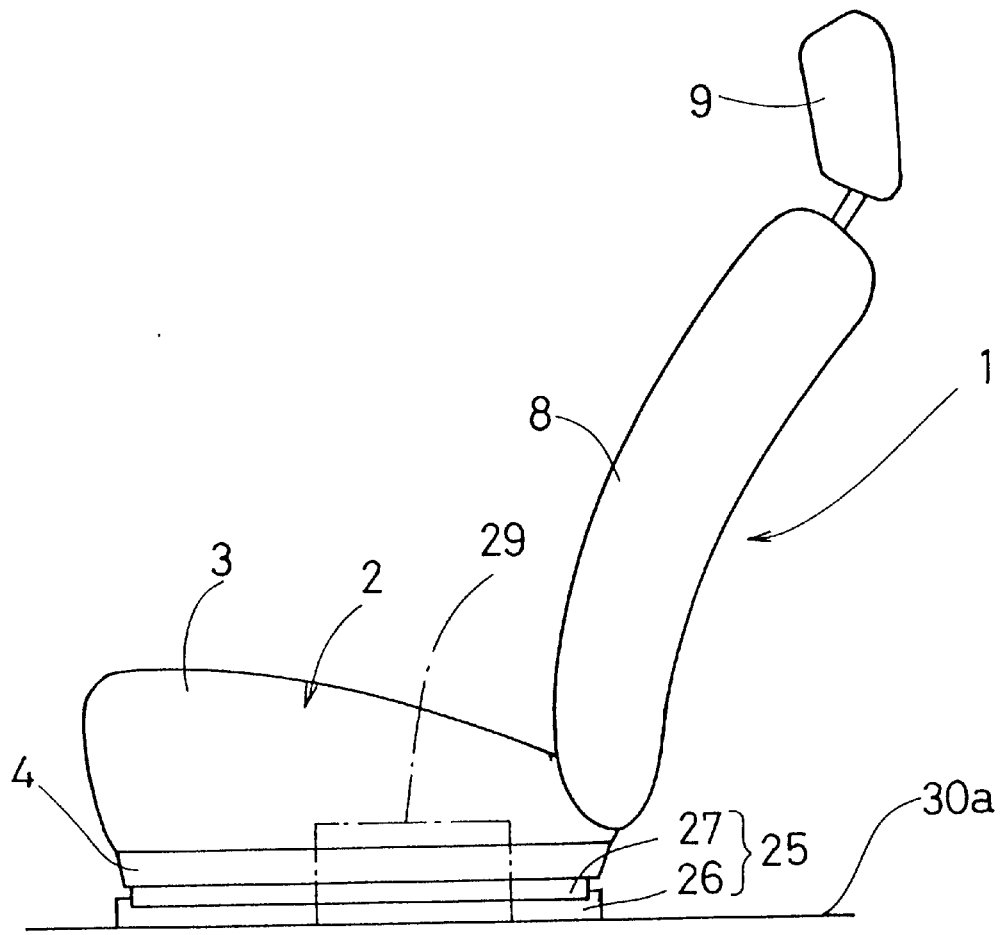
FIG. 2 is a side schematic view of a seat.
Figure 8:
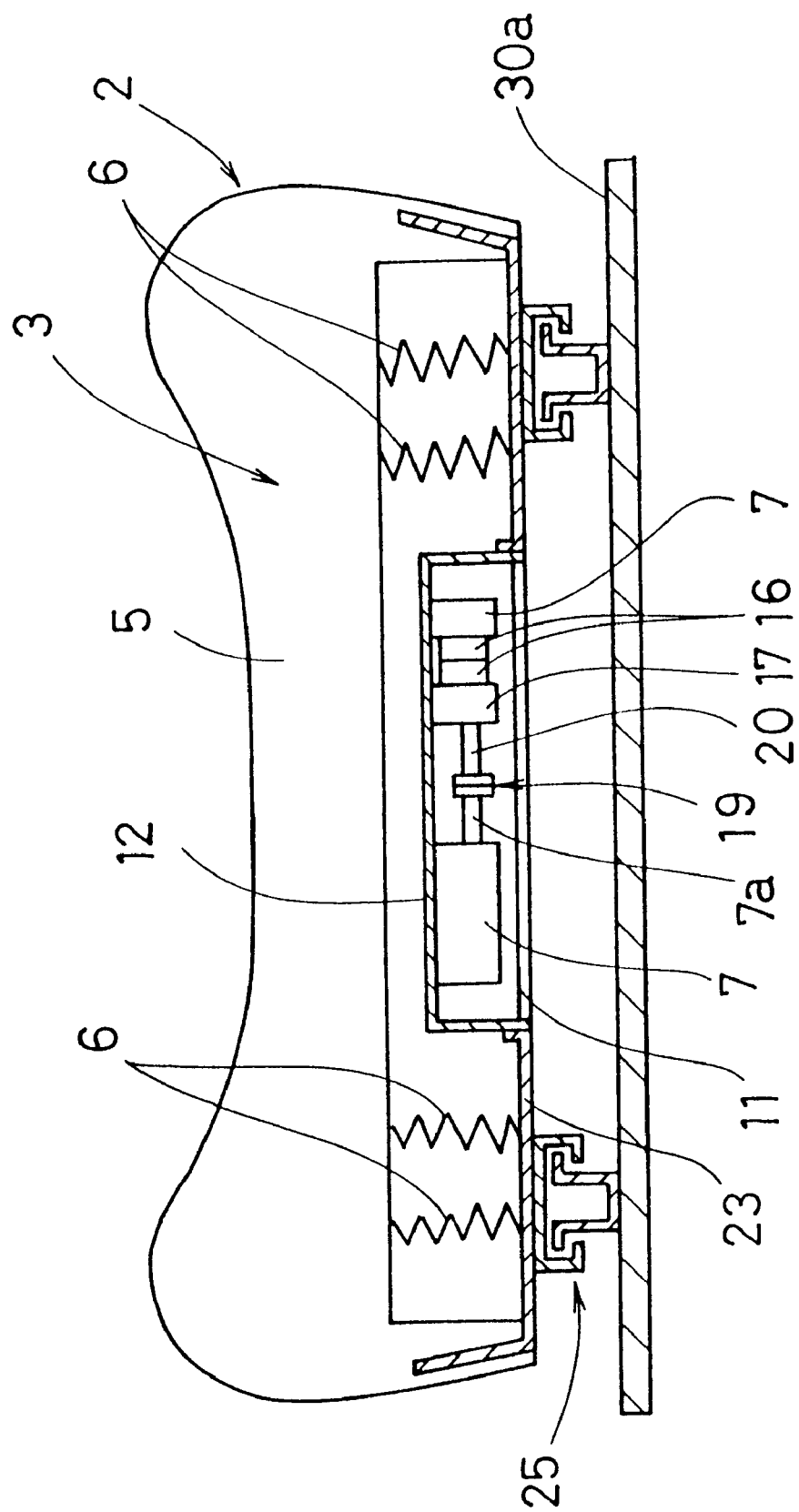
FIG. 8 is a side view of a second embodiment of the present invention.

FIG. 1 shows a side view of the first embodiment of the present invention. In this embodiment, a seat bottom 2 of a seat 1 (shown in FIG. 2) is fixed via seat sliding mechanisms 25 on a floor surface 30a of an automobile 30 (shown in FIG. 3). Each of the seat sliding mechanisms 25 is provided with a lower sliding rail (a seat-support member) 26 fixed by a bolt (not shown) on the floor surface 30a of the automobile 30, an upper sliding rail 27 fixed by a bolt (not shown) on the underside of the seat bottom 2 and a control lever (not shown) and similar. In FIGS. 2, 8 is a seat back of the seat 1 and 9 is a headrest thereof.

Figure 4:
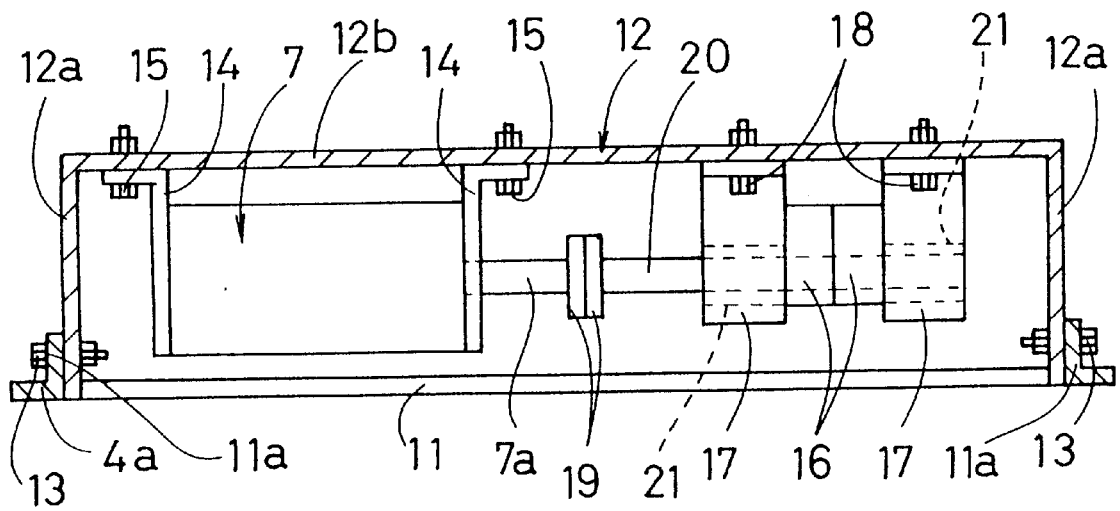
FIG. 4 is a side view of a motor and unbalanced weights.
Figure 5:
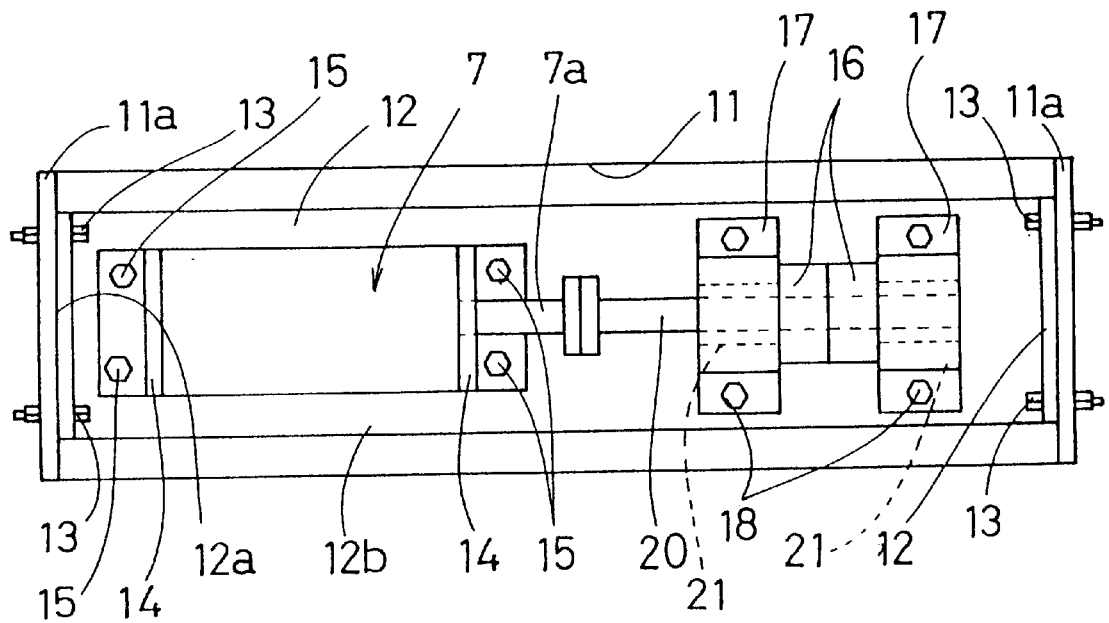
FIG. 5 is a plan view of a motor and unbalanced weights.
Figure 6:
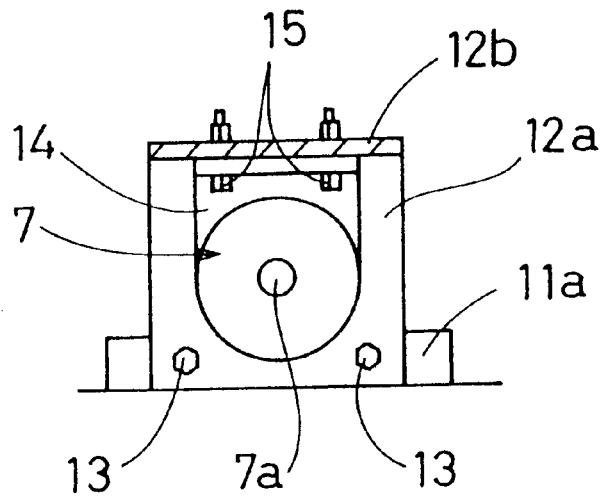
FIG. 6 is a right side view of a motor.

The seat bottom 2 is provided with a seat cushion member 3 including a urethane pad 5, a spring 6 (shown in FIG. 8) and similar, and a dish-shaped backup member 4 made of a metal rigid body. The upper sliding rail 27 of the seat sliding mechanism 25 is fixed by a bolt (not shown) on a bottom plate 4a of the backup member 4. In the meantime, a collar 4b is formed on the periphery of an upper end of the backup member 4. The lower end of the seat cushion member 3 is placed and fixed on the collar 4b or supported thereby. A rectangular slot 11 is arranged at an approximate middle part of the backup member 4 and, each right and left side of the slot 11 is folded upwardly to be formed into a folding portion 11a, on which (each lower end of two corresponding longitudinal members 12a of) an iron concave plate 12 is fixed by bolts 13 as shown in FIG. 4 to 6. Further, L-shaped stationary plates 14, which are aligned on both right and left sides of a direct current motor 7, are fixed by bolts 15 on a horizontal plate 12b of the concave plate 12. An edge of a rotation shaft 7a of the direct current motor 7 projects out of an exterior wall and is connected via a coupling (or a connecting member) 19 with a rotation shaft body 20.

Figure 7:
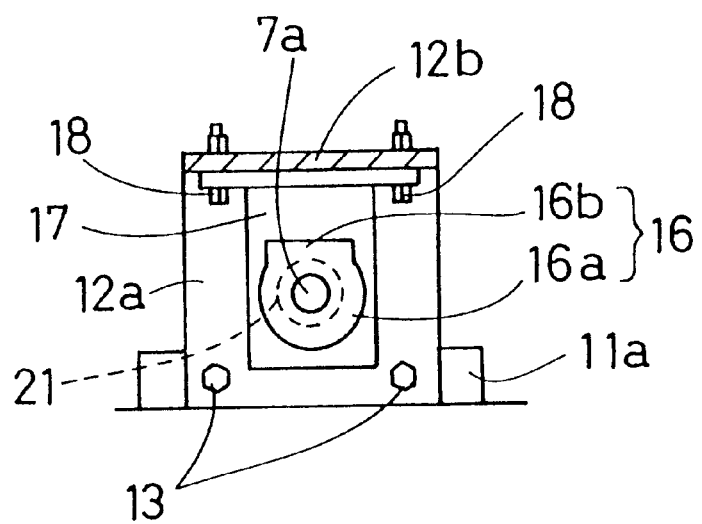
FIG. 7 is a side view of an unbalanced weight.

The rotation shaft body 20 is rotatably supported by a pair of support bodies 17 aligned at a specific interval. Through holes are formed in the pair of support bodies 17 in such a manner that the holes correspond to each other. Metal bearings 21 are engaged with the through holes. The rotation shaft body 20 is rotatably supported by both of the metal bearings 21. Further, a pair of detachable unbalanced weights 16 are installed between both of the support bodies 17 on the rotation shaft body 20. Each unbalanced weight 16 is formed into a disc shape, respectively, and as shown in FIG. 7, includes two-thirds of a circular arc portion 16a aligned concentrically with the rotation shaft 7a of the direct current motor 7 and a rectangular portion 16b formed on the chord joining the ends of the two-thirds of acircular arc portion 16a. Still further, the rotation shaft 7a of the direct current motor 7 and the rotation shaft body 20 are arranged horizontally and a right-left direction of the seat 1 (in such a manner that they cross at right angles to the direction of progress of the automobile 30 shown in FIG. 2). In the figure, bolts 18 fasten both of the support bodies 17 on the horizontal member 12b of the concave plate 12.

Figure 3:
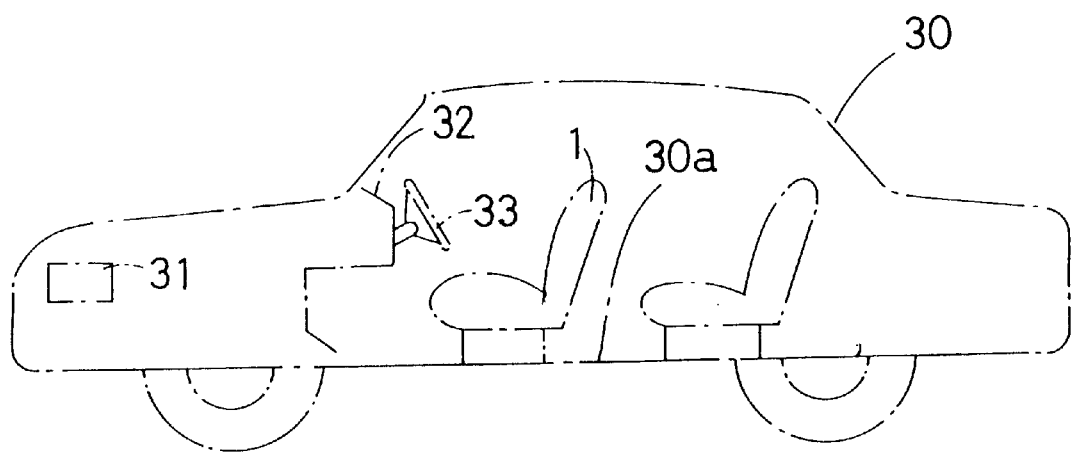
FIG. 3 is a side schematic view of an automobile.

The direct current motor 7 is electrically connected with a battery 31 mounted in the front part of the automobile 30 shown in FIG. 3. Further, a START switch (not shown) for starting the direct current motor 7, a STOP switch (not shown) for stopping thereof, a vibration control switch (not shown) for adjusting the degree of vibration and similar are installed in a control box 29 (shown as a dashed line in FIG. 2) which is aligned along the seat 1. The vibration control switch has three levels: "a weak position" whereby 1,200 rpm in the rotation number of the direct current motor 7 may impart the vibration of 37 kgf in force, 5 mm in amplitude and 20 Hz in frequency with a seat maximum load 100 kg to the seat 1 (a vibration which vibrates the seat 1 in the direction of progress of the automobile 30); "a middle position" whereby 1,700 rpm thereof may impart the vibration of 53.3 kgf in force, 7 mm in amplitude and 28 Hz in frequency to the seat 1; and "a strong position" whereby 2,500 rpm may impart the vibration of 83.3 kgf in force, 10 mm in amplitude and 42 Hz in frequency to the seat 1. In every level, a vibration cycle of a 20-second vibration and a 10-second interval repeats several times (three times in this embodiment of the present invention). In FIG. 3, an instrumental panel 32, wherein a cluster of meters are installed, and a wheel 33 are shown.

In this first embodiment, if a driver feels drowsiness, he may push the START switch of the control box 29 so as to actuate the direct current motor 7. Then, the direct current motor 7 may run so that the rotation shaft 7a rotates, the rotation shaft body 20 connected therewith rotates and both of the unbalanced weights 16 attached thereto rotate (in a periodical manner that a 20-second vibration and a 10-second interval repeats alternately three times as mentioned above). Subsequently, this vibration is transmitted to the seat bottom 2 of the seat 1 via both of the support bodies 17 and a backup member 4. As a result, the whole seat 1 vibrates as the seat bottom 2 vibrates so that a driver who seats himself on the seat 1 may shake off his drowsiness in order not to doze off during driving.

Thus, according to the above first embodiment, the vibration produced by the unbalanced weights 16 of the rotation shaft body 20 connected with the rotation shaft 7a of the direct current motor 7 is transmitted to the seat 1 to be vibrated so that a driver may avoid dozing off during driving, resulting in complete prevention of car accidents caused by dozing off at the wheel. In the meantime, since the seat itself vibrates, the vibration is necessarily transmitted to the driver regardless of his posture as long as he seats himself on the driver's seat, even if he has started to nod off due to drowsiness. For this reason, the driver's dozing off at the wheel can effectively be prevented. Further, since the rotation shaft 7a and the rotation shaft body 20 of the direct current motor 7 are aligned in a right-left direction of the seat 1 (in such a manner that they cross at right angles to the direction of progress of the automobile 30), the seat 1 can be vibrated along the direction of progress (back and forth) as well as up and down, and the driver's dozing off at the wheel can effectively be prevented. In addition, if the length of the rotation shaft body 20 or the position for installing the unbalanced weights 16 is adjusted, the position where the vibration is produced can be adjusted. Furthermore, the direct current motor 7 and both of the unbalanced weights 16 are contained within the dish-shaped backup member 4 and protected thereby so that they will not be damaged, even if a can or similar on the floor surface 30a of the automobile 30 rolls over and goes under the seat bottom 2 of the seat 1.

FIG. 8 illustrates a side view of another embodiment of the present invention. In this second embodiment, a direct current motor 7, shown in FIG. 4, is contained within a seat cushion member 3 and fixed therein. Namely, the direct current motor 7 is mounted on a dish-shaped frame body 23 supporting an urethane pad 5 in such a manner that springs 6 are installed within a space under the urethane pad 5 which forms the seat cushion member 3. Except for that, the remaining parts are the same as the above-described first embodiment. The same reference numerals are allotted for like parts.

According to the second embodiment, the direct current motor 7 is contained within the seat cushion member 3 and fixed therein. Therefore, this configuration is easily applicable for an automobile 30 which does not have the backup member 4 of the first embodiment shown in FIG. 1. Further, the direct current motor 7 is protected by the seat cushion member 3 so as not to be damaged by a can or similar which may be rolling or sliding around on the floor surface 30a of the automobile 30. Still further, this embodiment retains the same function and effects as those of the first embodiment.

Figure 9:
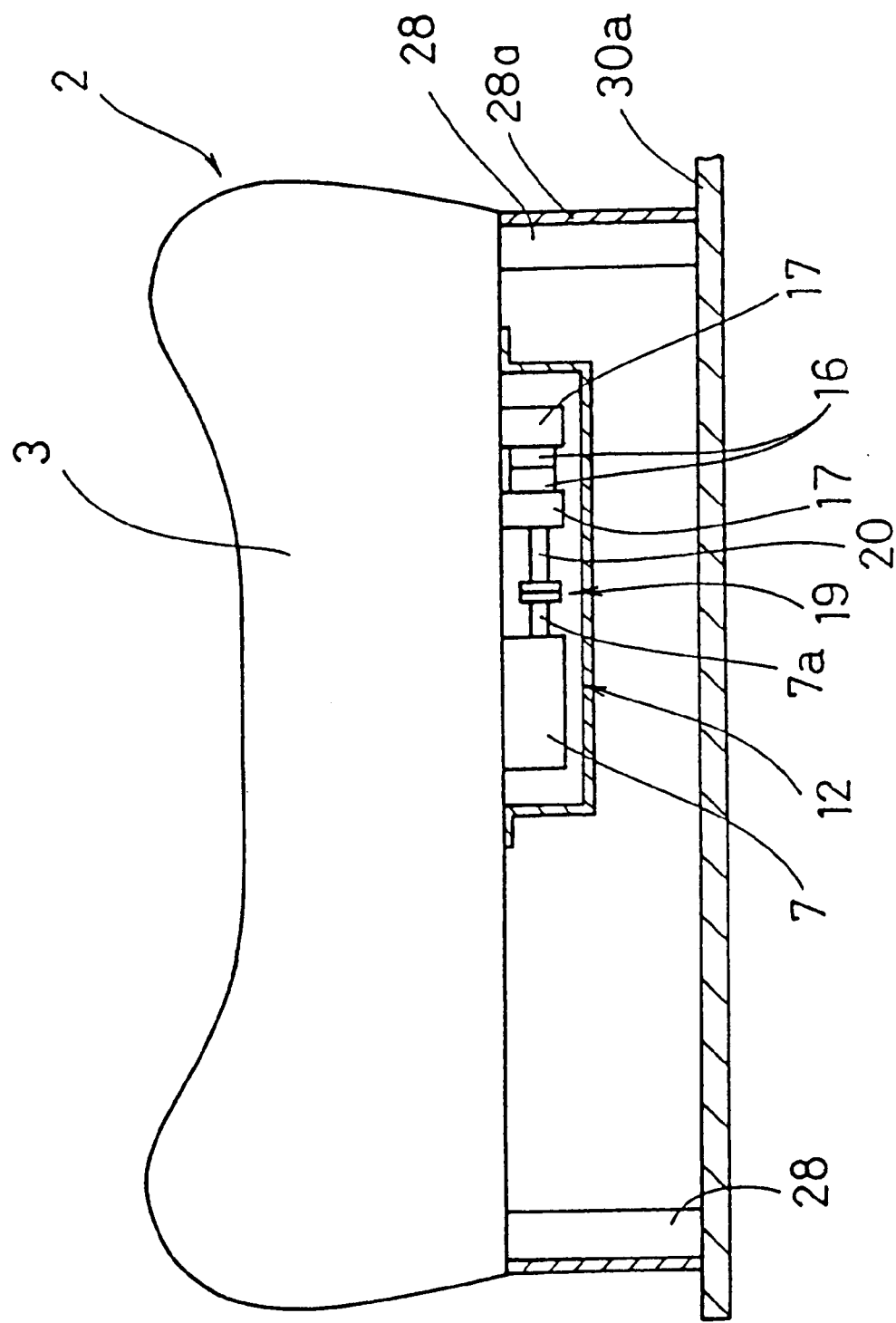
FIG. 9 is a side view of a third embodiment of the present invention.
Figure 10:
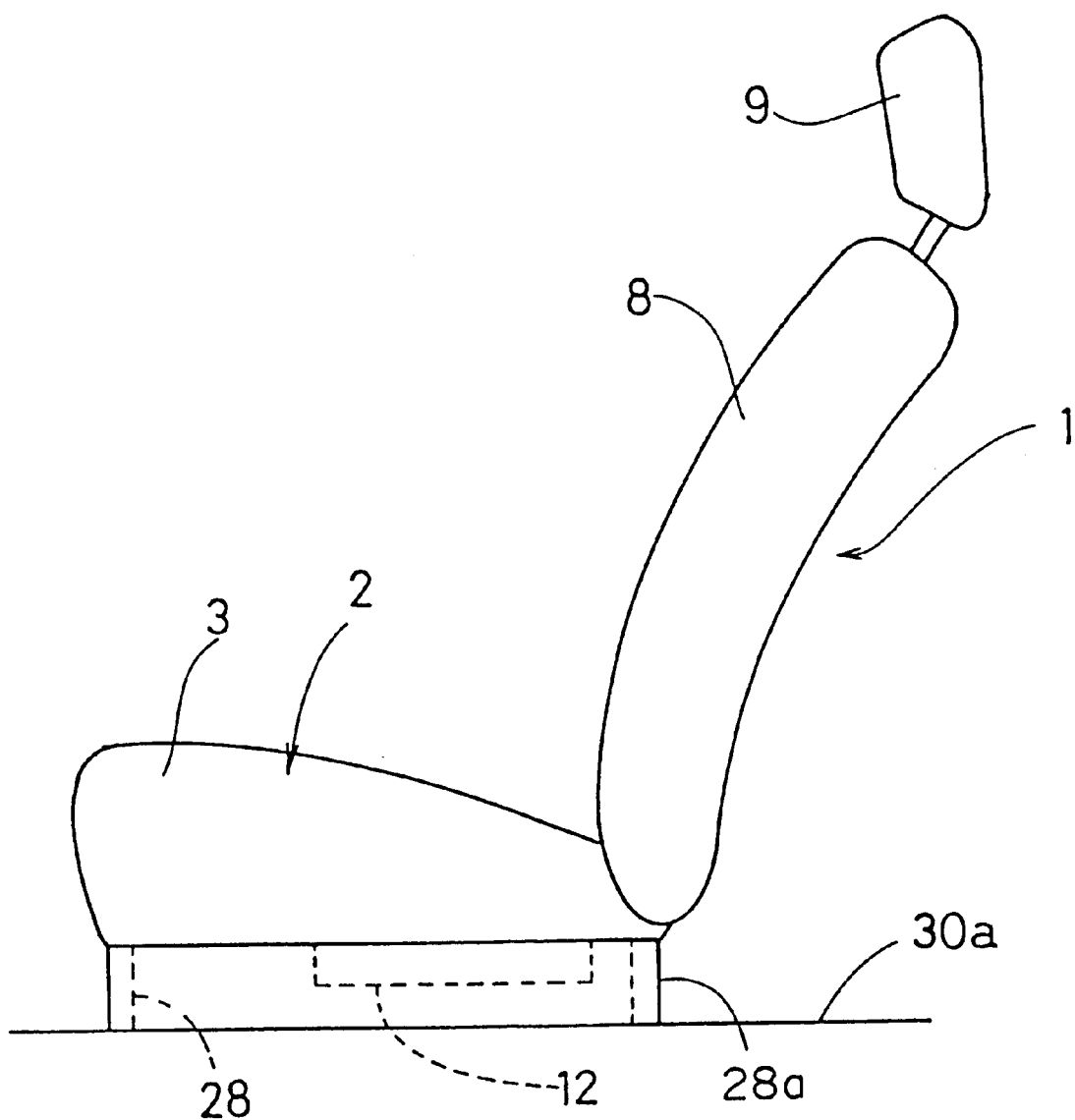
FIG. 10 is a side view illustrating a position where a direct current motor is mounted in the third embodiment.

FIG. 9 illustrates a third embodiment of the present invention. In the third embodiment, the direct current motor shown in FIG. 4 is mounted on the underside of a seat bottom 2 and contained within a rectangular cover 28a made of a plate, fabric or similar surrounding a space under the seat bottom 2. In the meantime, the position where a direct current motor 7 is placed, is not the middle of the underside face of the seat bottom 2, but rather the position is shifted towards the right or left (the position is shifted towards the right in the drawing figure) and also shifted toward the rear (as shown in FIG. 10). In the figure, legs 28 are extended from the four corners of the seat bottom 2 and are fixed on a floor surface 30a of an automobile 30. Except for that, the remaining parts are the same as those of the above-described first and second embodiments. The same reference numerals are given to like parts.

According to this the embodiment, the direct current motor 7 is contained within the cover 28a surrounding a space under the seat bottom 2 and fixed therein so that the direct current motor 7 can easily be mounted on the seat bottom 2 in case of the automobile 30 having no extra space within the seat bottom 2. Further, the direct current motor 7 is protected by the cover 28a so as not to be damaged by a can or similar that may be rolling or sliding around on the floor surface 30a of the automobile 30. Still further, the direct current motor 7 is mounted on the rear part of the seat bottom 2 of the seat 1, and is positioned approximately right under a driver's hip so that the vibration can be surely and strongly transmitted to the driver through hip. This promotes the effect of preventing the driver's dozing off at the wheel more efficiently. Even still further, the third embodiment retains the same function and effects as those of the first embodiment.

Further, in all of the above-described embodiments, the direct current motor 7 and the rotation shaft body 20 are mounted in such a manner that they cross at right angles to the direction of progress of the automobile 30, but this is not critical. The direct current motor 7 and the rotation shaft body 20 may be mounted in such a manner that they are parallel to the direction of progress of the automobile 30. In this case, vibrations which vibrate the seat 1 at right angles to the direction of progress of the automobile 30 (i.e., in a right-left direction) as well as vibrations which vibrate the seat 1 up and down can be produced so that the driver's dozing off during driving can effectively be prevented. In this way, the direction in which to mount the direct current motor 7 and the rotation shaft body 20 can appropriately be selected so that the vibration can be arranged in accordance with a driver's taste. In the meantime, the magnitude of the vibration is set up at 11 to 46 Hz in frequency, and more preferably 16 to 28 Hz with a seat maximum load 100 kg. A frequency over 46 Hz may produce extremely strong vibrations and interfere with driving, while a frequency less than 11 Hz does not produce enough vibrations to alert and awaken the driver. In addition, a test has proven that the frequency within a range of 16 to 28 Hz can surely alert and awaken a driver with suitable vibrations.

Meanwhile, in all of the above-described embodiments, if a driver feels drowsiness coming over him, he pushes on a START switch arranged on the control box 28*a* so as to actuate the direct current motor 7. A timer is acceptable instead of the START switch. In the case a timer is used, the timer must be set up to start when a car is started, and the direct current motor 7 will work for a certain amount of time, for example, 10 minutes after the driver has started the car. The timer will also stop the direct current motor 7 automatically after a certain amount of time, for example, 5 minutes after the vibrations have started. Such a timer is convenient if a driver knows in advance from his experience that he feels drowsiness coming over him in a certain amount of time (for example, 10 minutes) after starting to drive. When a timer is installed, an apparatus such as a precaution buzzer may be installed on the control box 28*a* to emit a metallic sound, a big intermittent sound or similar from a speaker thereof (for example, about 5 seconds) before the set time (when the direct current motor 7 turns on automatically) so as to signal that the vibrations will start soon. In the meantime, a switch for stopping the vibrations can be used together with the timer so that the driver can stop the vibrations manually. Further, in these embodiments, the START switch and the STOP switch for the direct current motor 7 are separately installed, but this is not critical. An on/off switch for starting/stopping the direct current motor 7 can be used. Still further, the control box 28*a* is installed beside the seat 1 in any of the three embodiments, but this is not critical. The control box 28*a* may be contained inside the instrumental panel 32. The switches, the timer and similar may be aligned on the instrumental panel 32 in the front of the seat 1.

In the meantime, the shape of the unbalanced weight 16 is not critical. Any shape is acceptable if it can rotate and produce vibration. Further, the seat bottom 2 is only composed of the seat cushion 3 in the second embodiment shown in FIG. 8. However, the seat bottom 2 maybe composed of the seat cushion member 3 and the backup member 4 (as shown in FIG. 1). Still further, the unbalanced weights 16 are mounted on the rotation shaft body 20 connected with the rotation shaft 7*a* of the direct current motor 7, but this is not critical. The unbalanced weights 16 may be mounted on the rotation shaft 7*a* of the direct current motor 7.

In the first and second embodiments shown in FIGS. 1 and 8, respectively, the seat 1 is installed on the floor surface 30*a* of the automobile 30 via the seat sliding mechanisms 25, but this is not critical. The seat 1 may be fixed immovably on the floor surface 30*a*. Further, in the third embodiment shown in FIG. 9, the legs 28 are fixed on the floor surface 30*a*, but this is not critical. The legs may be fixed on the seat sliding mechanisms 25 shown in FIG. 1. Still further, the sliding mechanisms 25, in the first and second embodiments shown in FIGS. 1 and 8, respectively, or in the above modification of the third embodiment (wherein the legs are fixed on the sliding mechanisms 25) of FIG. 9, may be mounted on an air-cushion device.

EFFECTS OF THE INVENTION

As mentioned above, according to the apparatus for vibrating a seat of the present invention, a facilities for vibrating is installed inside a seat bottom of a seat or directly installed on an under surface of a seat bottom of the seat so that vibration thereby can be transmitted to the seat to be vibrated. A driver who seats himself on the seat may prevent his dozing off during driving accordingly. Thus, car accidents caused by the driver's dozing off at the wheel can be prevented completely. Meanwhile, since the seat itself vibrates, the vibration is necessarily transmitted to a driver regardless of his posture as long as he seats himself on the driver's seat, even if he has started to nod off with drowsiness. For this reason, the driver's dozing off at the wheel can effectively be prevented. In the meantime, in the embodiment of the present invention wherein the facilities for vibrating comprises a motor and unbalanced weights attached to a rotation shaft thereof so as to vibrate a seat with vibration caused when the rotation shaft of the motor rotates, the vibration produced by the rotation of the motor is transmitted to a seat to be vibrated. Moreover, if the direction of the rotation shaft of the motor is selectively varied, the direction of vibration to the seat can be varied. Further, in the embodiment of the present invention wherein the seat bottom of the seat comprises a seat cushion member and a backup member, which supports the seat from thereunder, to which a motor is fixed, there are the advantages that no extra space is required around the seat bottom and the motor can be protected by the backup member. Still further, in the embodiment of the present invention wherein the seat bottom of the seat is provided with a seat cushion member on which the motor is installed and a backup member for supporting the seat cushion member, there are the advantages that no extra space is required around the seat bottom and the motor can be protected by the seat cushion member. Even still further, in the embodiment of the present invention wherein the unbalanced weights are attached to the rotation shaft projecting through an exterior wall of the motor, there is an advantage that the unbalanced weights can easily be replaced. Even still furthermore, in the embodiment wherein the unbalanced weights are attached to the rotation shaft body connected through a coupling member with a projection of the rotation shaft projecting out of an exterior wall of the motor, the position where the vibration is produced can be varied by appropriately selecting the length of the rotation shaft body or varying the position at which the unbalanced weights are installed, so that the driver's dozing off at the wheel can effectively be prevented.

What is claimed is:

1. An apparatus for vibrating a seat comprising:
   a seat including a seat back and a seat bottom, wherein said seat bottom includes a urethane pad seat cushion member fixedly supported on a seat-support member and said seat bottom is installed on legs, within a rectangular cover, at a predetermined distance above a floor surface of a vehicle; and
   means for vibrating said seat, positioned towards the right or left of the middle ot said seat bottom and thus arranged approximately under a driver's hip, wherein said means for vibrating said seat is directly installed on an under surface of said urethane pad seat cushion of said seat bottom of said seat.

2. The apparatus for vibrating a seat according to claim 1, wherein said means for vibrating said seat has a rotation shaft, said rotation shaft projecting through an exterior wall of said means for vibrating said seat and an unbalanced weight is installed on a portion of said rotation shaft which projects outwardly from said exterior wall.

3. The apparatus for vibrating a seat according to claim 1, wherein said means for vibrating said seat includes a rotation shaft, said rotation shaft projecting through an exterior wall of said means for vibrating said seat, and said means for vibrating said seat also includes a rotation shaft body, said rotation shaft body being combined with an end of said rotation shaft which projects outwardly from said exterior wall of said means for vibrating said seat via a coupling member, and said means for vibrating said seat also includes an unbalanced weight which is installed on said rotation shaft body.

* * * * *